Oct. 6, 1925.   1,556,406
L. BLOCK
BY-PASS VALVE WITH STOP AND MOUNTING THEREFOR
Filed April 2, 1925
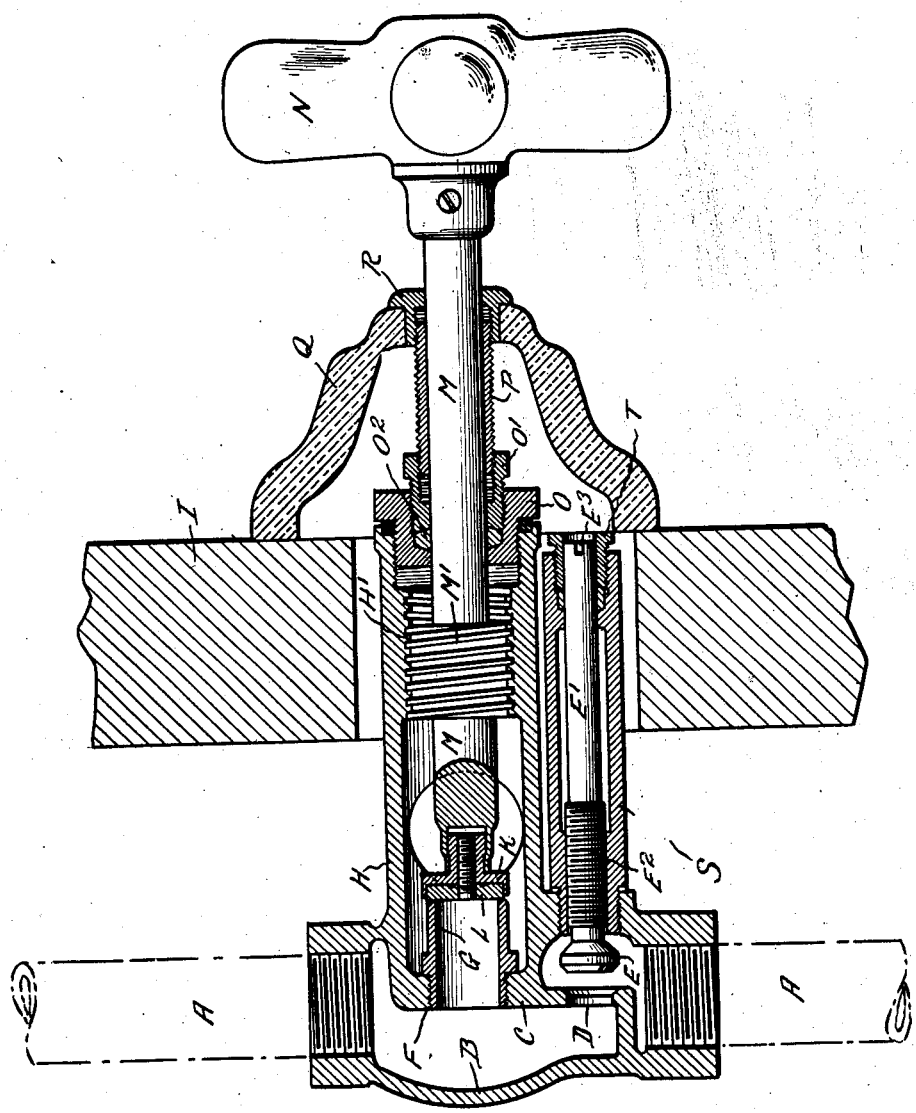
Inventor
Leon Block
By
Hull Brock & Watts
Attys.

Patented Oct. 6, 1925.

1,556,406

UNITED STATES PATENT OFFICE.

LEON BLOCH, OF CLEVELAND, OHIO, ASSIGNOR TO THE REPUBLIC BRASS COMPANY, OF CLEVELAND, OHIO, A CORPORATION OF OHIO.

BY-PASS VALVE WITH STOP AND MOUNTING THEREFOR.

Application filed April 2, 1925. Serial No. 20,092.

*To all whom it may concern:*

Be it known that I, LEON BLOCH, a citizen of the United States, residing at Cleveland, in the county of Cuyahoga and State of Ohio, have invented a certain new and useful Improvement in By-Pass Valves with Stops and Mountings Therefor, of which the following is a full, clear, and exact description, reference being had to the accompanying drawings.

This invention relates generally to plumbing fixtures and more particularly to a by-pass valve and covering therefor used in connection with bathtub fixtures which embody in connection with the bathtub a shower attachment, the valves controlling such shower being arranged in the wall at the rear of the tiling.

It frequently happens that it is necessary to replace washers for valve facings and in order to do so, it is necessary to cut off the water supply from the valve casing. This could be accomplished by having a separate valve in the line but according to my invention I propose to arrange a supplemental cut-off valve in the valve casing proper and in close proximity to the main valve, which supplemental valve can be closed whenever it is desired to make any repairs to the valve proper.

Another object of my invention is to provide for covering not only the valve proper but also the supplemental valve.

With these various objects in view, my invention consists in the novel features of construction and combination all of which will be fully described hereinafter and set forth in the appended claims.

In the drawing forming a part of this specification the figure is a vertical sectional view of a by-pass valve connected in accordance with my invention, certain parts being shown in elevation.

Referring to the drawing, A indicates the water suply pipe in which is interposed the valve casing B having the partition C provided with an opening D which may be closed by the supplemental cut-off valve E.

The partition C is also provided with a threaded opening F into which is screwed the tubular valve seat G extending a considerable distance into the cylindrical chambered portion H of the valve casing, this cylindrical portion H being of such length as to extend substantially through the wall and tile facing I.

Seated upon the tubular valve seat G is the valve K having a detachable facing L, the valve K being carried at the inner end of the stem M which is enlarged and threaded at M', this threaded portion engaging the internally threaded portion H' of the chambered portion H. The stem M extends outwardly a sufficient distance and has the operating handle or knob N detachably connected thereto.

The outer end of the chambered portion of the casing H is closed by means of a gasket O and this in turn has another gasket O' inserted in the outer end thereof and confining the packing O².

In practice, I prefer to have an externally threaded tube P screwed into the gasket O' and through which the stem M projects, this threaded sleeve serving as a guide for the stem and also as a means for securing the escutcheon Q, preferably of porcelain which surrounds the stem and conceals the valve casing and also the opening in the wall and tiling, this escutcheon being fastened and positioned by means of a cap R surrounding the stem fitting into the outer end of the escutcheon and having threaded engagement with the externally threaded tube P.

The supplemental cut-off valve E has a stem E' externally threaded at E², said stem being located in a housing S screwed into the casing and extending parallel with the cylindrical portion H of the valve casing proper, this housing S extending into the opening in the wall and having its outer end closed by means of a gasket T through which the outer end of the stem E' works, the extreme outer end being slotted as shown at E³ for the reception of a screw driver for the purpose of turning the stem E' to operate the supplemental cut-off valve E. The outer end of the housing S is also enclosed within and concealed by the escutcheon Q, as most clearly shown in the drawing.

In the ordinary use of the device the supplemental valve E is opened as indicated in the drawing.

If for any reason it should be desired to replace or repair the valve or any of the packings thereof, the handle or knob N can be detached from the valve stem, the escutcheon removed, and by turning the valve stem E' in the proper direction the supplemental cut-off valve E can be seated in the opening D, cutting off the supply of water to the valve casing proper. The valve K can then be removed for the purpose of making any repairs, replaced and then the supplemental cut-off valve E can be opened again and the escutcheon and operating handle or knob replaced.

It will thus be seen that I provide in connection with the wall valve casing a supplemental cut-off valve which can be quickly and easily operated when necessary, and that I also provide means for concealing not only the operative parts of the valve proper but also the supplemental cut-off valve.

Having thus described my invention, what I claim is:—

1. The combination with a valve casing having a main valve and stem, said stem extending through a wall opening, of a supplemental cut off valve and stem, said stem extending into the wall opening, and an escutcheon arranged upon the main valve stem and concealing the wall opening and supplemental valve stem.

2. The combination with a valve casing having a chamber adapted to fit into a wall opening, of a main valve and stem for operating the same, a supplemental cut off valve and stem for operating the same, and an escutcheon arranged upon the main valve stem and concealing the valve casing chamber and supplemental valve stem.

3. The combination with a valve casing, valve and stem, said stem being adapted to extend through a wall opening, of a supplemental cut off valve and its stem, a housing for said stem connected to the valve casing and adapted to extend into the wall opening and means connected to the main valve stem for covering the wall opening.

4. The combination with a valve casing, main valve and stem, said casing having a chamber in which the main stem is located, said chamber being adapted to extend into a wall opening, the main valve stem extending beyond said wall, of a housing connected to the valve casing and parallel with the chamber, said housing being also located in the wall opening, a valve and stem in said housing, said valve being a supplemental cut off valve and adapted to close the inlet opening in the valve casing, the outer end of said supplemental valve stem being adjacent the outer edge of the wall opening.

5. The combination with a valve casing having two openings in its partition, of a main and supplemental valve, a main and supplemental valve stem, a tubular seat for the main valve, a casing chamber for the main valve and stem, a housing for the supplemental valve stem, said chamber and housing being adapted for location in a wall opening, the outer end of the supplemental valve stem being shaped to receive an operating tool, an operating handle upon the outer end of the main valve stem, and means carried by said main valve stem for covering the wall opening and concealing the casing chamber and housing.

6. The combination with a valve casing having two openings, one of said openings having a tubular seat arranged therein, of a main valve seating upon said seat, a stem for said valve, said valve casing having a chamber for said main valve and stem, a supplemental valve and stem, said supplemental valve being adapted to close the inlet opening in said valve casing, a housing connected to the casing and in which the supplemental valve stem works, said housing and casing chamber being adapted for location in a wall opening, the outer end of the supplemental stem being located adjacent the outer edge of said opening, means for closing the ends of the chamber and housing, the outer end of the supplemental stem being shaped to receive an operating tool, an operating handle upon the end of the main stem and means carried on said stem for covering the wall opening and concealing the outer ends of said chamber and housing.

In testimony whereof, I hereunto affix my signature.

LEON BLOCH.